July 9, 1957 P. MOTORNEY 2,798,780
REVERSIBLE SERVICE TRAY FOR AUTOMOBILES AND THE LIKE
Filed April 3, 1956 3 Sheets-Sheet 1
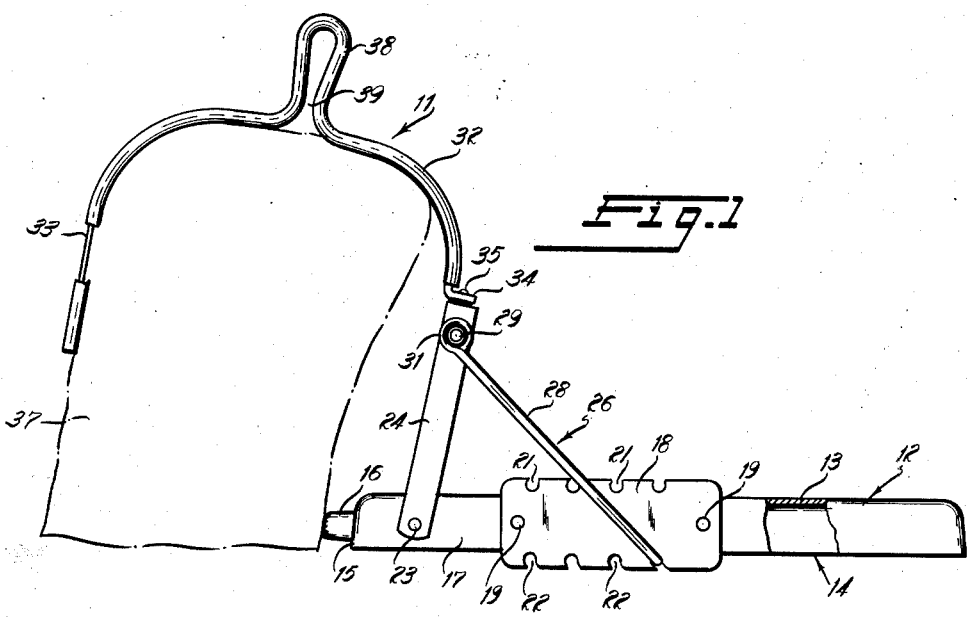
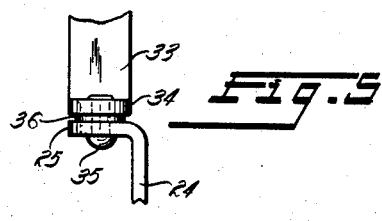
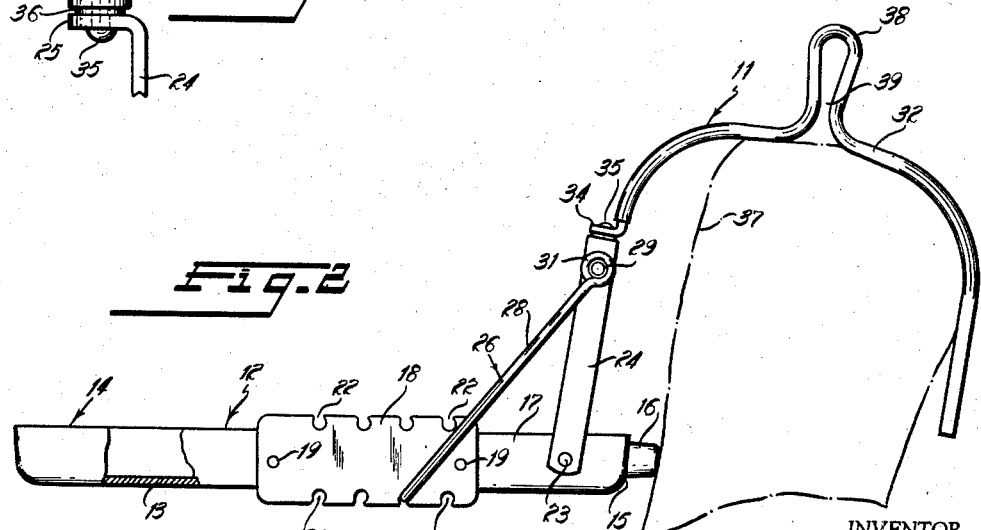
INVENTOR
PAUL MOTORNEY
BY
ATTORNEYS July 9, 1957  P. MOTORNEY  2,798,780
REVERSIBLE SERVICE TRAY FOR AUTOMOBILES AND THE LIKE
Filed April 3, 1956  3 Sheets-Sheet 2

INVENTOR
PAUL MOTORNEY
BY Strauch, Nolan & Neale
ATTORNEYS

July 9, 1957          P. MOTORNEY          2,798,780
REVERSIBLE SERVICE TRAY FOR AUTOMOBILES AND THE LIKE
Filed April 3, 1956          3 Sheets-Sheet 3

INVENTOR
PAUL MOTORNEY

ATTORNEYS

United States Patent Office 2,798,780
Patented July 9, 1957

2,798,780

REVERSIBLE SERVICE TRAY FOR AUTOMOBILES AND THE LIKE

Paul Motorney, Bronx, N. Y., assignor to Theodore Motorney, Washington, D. C.

Application April 3, 1956, Serial No. 575,841

8 Claims. (Cl. 311—22)

This invention relates to collapsible tray assemblies adapted when unfolded to be removably mounted on automobile seat backs, windows and the like and is particularly concerned with tray assemblies of this type wherein the tray is reversible on its mounting structure to provide either a dish-like food support or a flat-topped table as for card playing.

It is the major object of the invention to provide an automobile seat or window mounted tray assembly wherein the tray may be reversed on support structure which suspends it from the car seat or the window area.

A further object of the invention is to provide a novel collapsible tray assembly wherein the tray is both reversible and adjustable on its suspension structure.

It is a further object of the invention to provide a novel automobile tray assembly suspension structure that is adapted to coact either with the back of a car seat or the edge of a window.

A further object is to provide a foldable car tray assembly having a reversible tray and suspension hooks that are freely swiveled about upright axes into operative positions in accord with the reversed tray positions.

A further object is to provide a car seat or window suspended tray assembly wherein the tray is reversible to provide either a shallow dish-like receptacle as for food service, or a flat topped table as for card playing, and is angularly adjustable on the suspension structure in either position.

Further objects of the invention will appear as the description proceeds in connection with the annexed drawings wherein:

Figure 1 is a side elevation of a tray assembly according to an embodiment of the invention mounted on the back of the front seat of an automobile broken away in one section and showing the tray positioned as a flat table;

Figure 2 is a similar side elevation showing the same tray assembly mounted at the front of the seat back and reversed to provide a dish-like shallow receptacle;

Figure 5 is a fragmentary enlarged view of the swivel mount of the suspension hooks.

Figure 3:
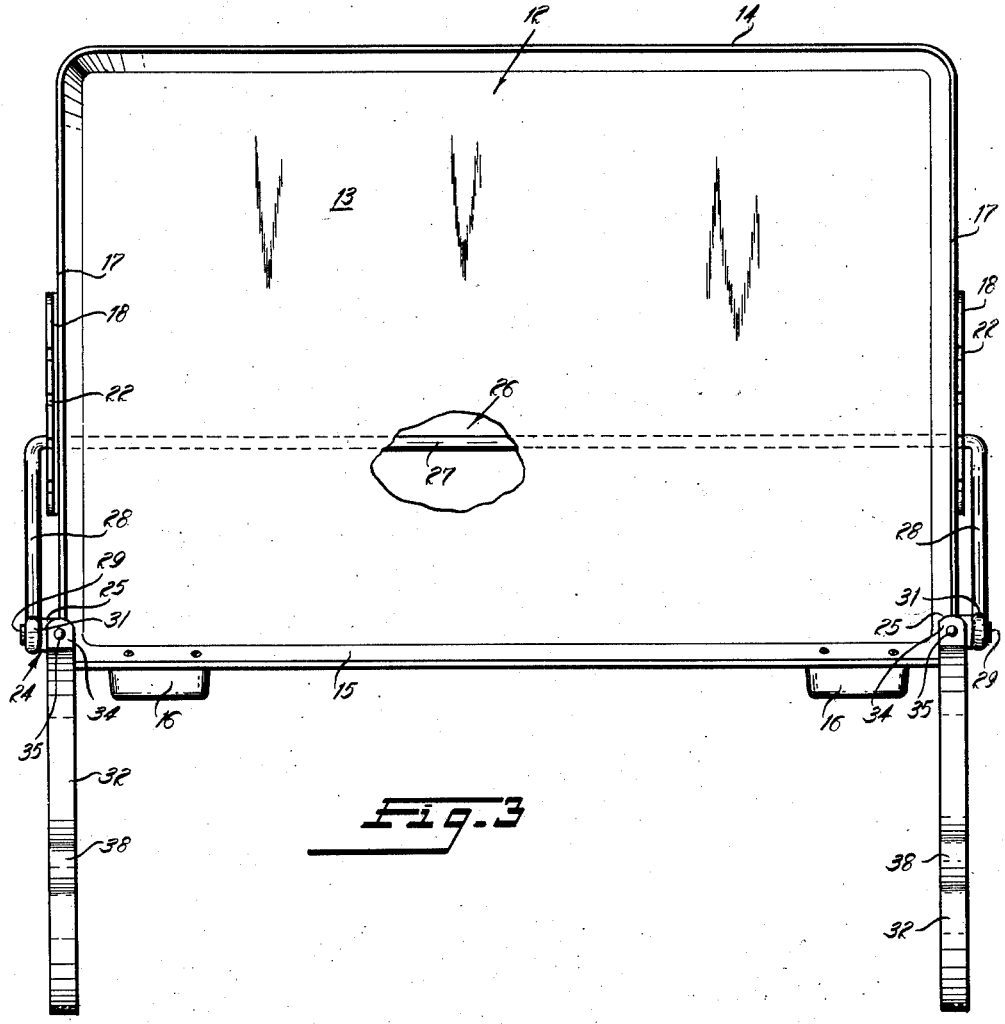
Figure 3 is a top plan view of the tray assembly in the Figure 2 position of the tray.

The tray assembly of the invention comprises a suspension structure 11 and a tray 12 that is reversibly and adjustably mounted on the suspension structure.

The tray 12 is preferably an integral rectangular shallow rigid receptacle stamped out of sheet metal or molded from a suitable non-metallic plastic, having a flat bottom wall 13 and a continuous side wall or rim 14 extending all around its periphery generally at right angles or slightly outwardly inclined with respect to the wall 13. Tray 13 may thus be any conventional shallow tray. Along its wall 15 nearest the suspension which is designated the rear wall, it has secured thereto two or more spaced rubber or like soft bumpers 16 for a purpose to be described.

Along the side walls 17 at similar locations are rigidly secured two identical stiff adjustment latch plates 18 as by rivets 19, each with a series of opposite upper and lower edge notches 21 and 22 respectively. These plates may be of metal or plastic.

Pivoted freely on coaxial axes 23 to side walls 17 near the intersection of walls 17 with rear wall 15 are two parallel similar suspension links 24. At their upper ends links 24 have integral right angle lips 25 that extend inwardly toward each other in the assembly.

A U-shaped frame 26 which comprises a generally horizontal bar 27 with right angled end arms 28 is freely pivotally mounted on the links 24 by means of oppositely outwardly projecting pivot posts 29 on the links with the upper ends of arms 28 formed with closed loops 31 hooked thereover. The outer ends of posts 29 are suitably enlarged and the loops 31 are sufficiently closed that the assembly is maintained against accidental detachment of the frame 26 from pivots 29 while permitting free swinging.

Upon the upper end of each link 24, sufficiently above pivot post 29 not to interfere with folding and reversing of the assembly parts, identical hook-like supports 32 are freely swiveled about axes parallel to the lengths of links 24. Each support comprises a length of rigid flat metal 33 bent to desired shape with a right angled lip 34 at one end adapted to be rotatably mounted on a pivot post 35 and overlying lip 25 of its link 24. The ends of posts 35 are riveted over to prevent accidental disassembly but yet permit free rotation of supports 32, and if desired washers 36 are included between the lips to improve the bearing action.

Figure 6:
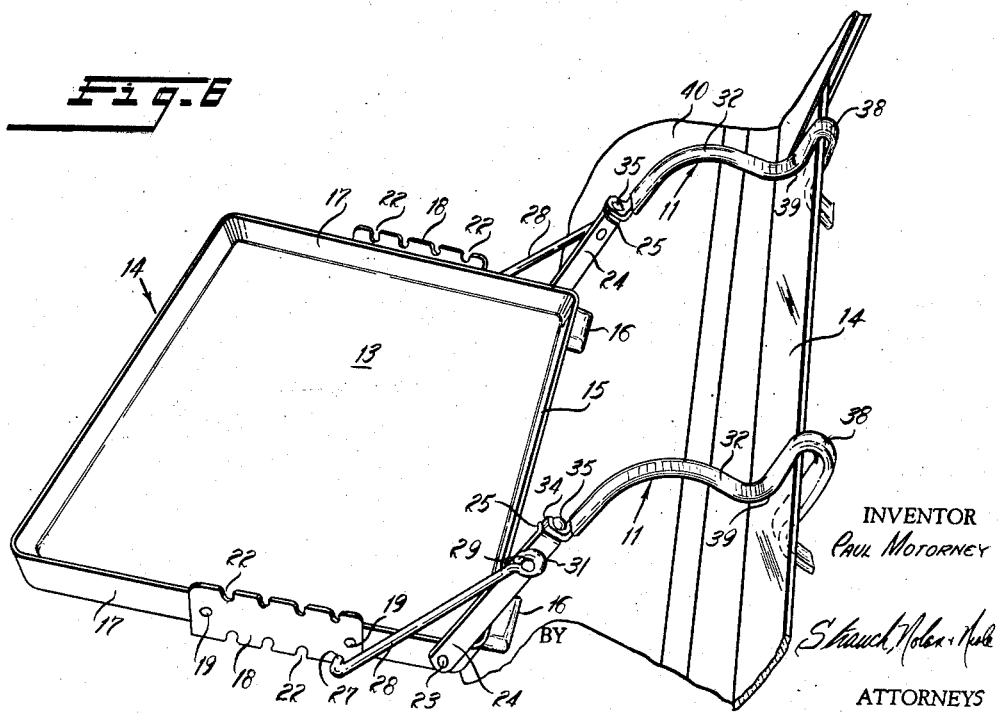
Figure 6 is a generally perspective view showing the tray assembly as mounted on a car window.

Supports 32 are of generally U-shape contoured to fit over the top of the usual car seat back 37, and are covered over most of their lengths with a sleeve of rubber or like non-friction material which is also non-abrasive with respect to seat custions, covers or the car panels as shown in Figure 6. At a point about midway each support is formed with an outstanding narrow loop section 38 that provides a resilient throat 39 for the purpose of window mounting as will appear.

In Figure 1, the tray assembly is shown as suspended from the back of the car front seat 37 by supports 32 that hook thereover. The weight of the tray causes it to engage bumpers 16 with the rear surface of the seat back, with the swivel connections at 35 adapting the assembly laterally. The tray 12 is adjusted to and held in horizontal position by latching the swinging frame 26 into the proper notches 22. During this adjustment the frame 26 swings freely about pivot 29 and tray 12 pivots freely about pivot 23, but once latched the parts mutually interlock and brace each other. Frame 26 thus not only latches the adjustment but its arms 28 extend out to support the tray, and bar 27 underlies rim 14 in this position to give added support.

Figure 1 thus shows the tray as a table with the flat surface of bottom wall 13 horizontal.

Figure 2 shows a different location for the tray assembly, in overlying relation to the front seat, and with tray 12 reversed to provide a shallow rimmed receptacle. Relocation without reversal may be accomplished merely by altering the angular position of latch frame 26 to suit the seat back contour. The reversal is accomplished by removing the assembly from the seat back, unlatching frame 26, turning the tray 12 through 180°, relatching frame 26 with the lower notches 21 as shown in Figure 2 in which position bar 27 underlies wall 13, and swiveling the supports 32 to hook over the seat back. The proper horizontal adjustment can be made with latch frame 26.

Figure 6 shows the tray assembly suspended outside the usual car window. The suspension is generally the same as on the seat back except that the window 41 is slightly raised above its ledge and the support loops 38 which had no function in the seat mounting fitted over the window, and the tray assembly allowed to settle against the rounded car side 40 on bumpers 16. The horizontal latch adjustment is then made. If desired the tray assembly may be similarly window mounted to the interior of the vehicle.

Thus the tray assembly of the invention may be suspended from the back of any seat of the automobile, or from any window, with the tray itself in either of its two reversed positions, and with the latched adjustment available in either reversed position.

Figure 4:
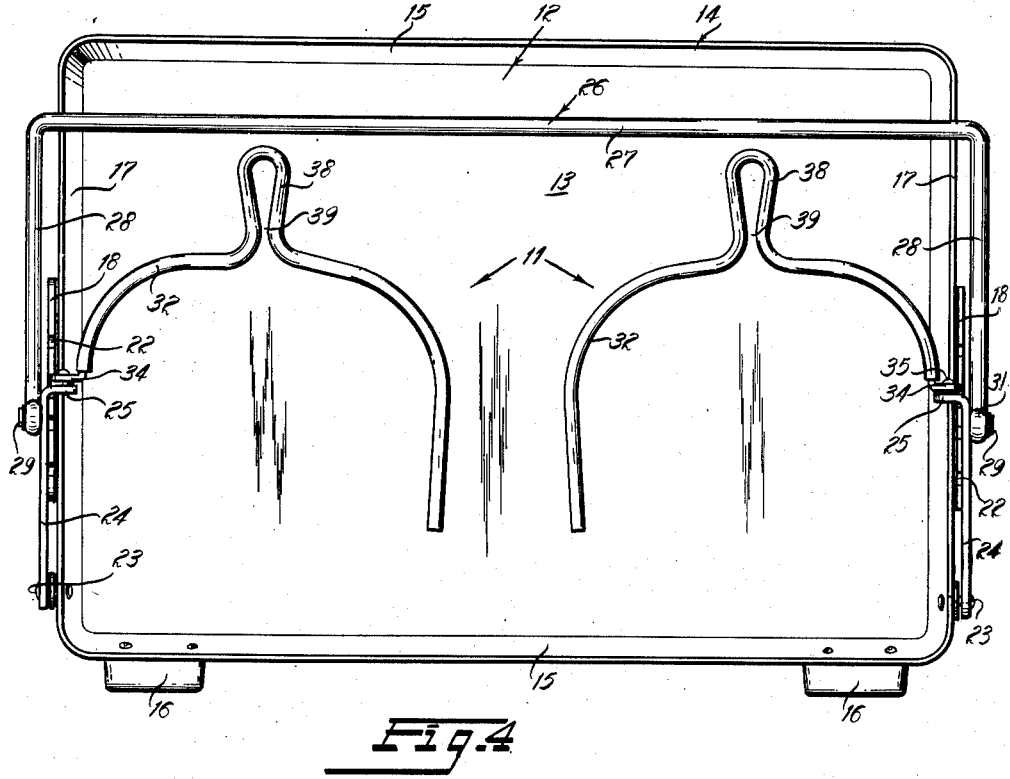
Figure 4 is a top view of the tray in collapsed storage condition.

When not used the tray assembly may be folded compactly into the condition of Figure 4 with the supports 32 swung at their free ends within the shallow tray.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a portable tray assembly, a suspension structure for removably mounting the assembly upon an automobile seat, window or the like, a tray mounted on said structure for reversal between two operative positions, and cooperating means on said structure and tray for latching said tray in level condition in either of said positions.

2. In the tray assembly defined in claim 1, said tray comprising a shallow receptacle in one of said positions, and providing a flat table surface in the reversed position.

3. In the tray assembly defined in claim 1, said suspension structure comprising hook-like supports swiveled about generally upright axes.

4. In the tray assembly defined in claim 3, said structure being collapsible to overlie the tray in a compact package.

5. In a collapsible tray assembly adapted for removable mounting on a car seat back or the like, a shallow tray having a flat bottom wall with rear and side walls upstanding therefrom, parallel links pivoted at one end to opposite side walls of the tray on a common axis near said rear wall, hook-like suspension supports swiveled on the other ends of said links, and adjustable coacting means on said links and the tray for holding said tray in level condition when said supports are hooked over a car seat back, said tray being reversible between 180° apart positions about its pivot axis with said links, and said adjustable means coacting therewith in either position.

6. In a collapsible tray assembly adapted for removable mounting on a car seat back, a tray, two parallel side links pivoted at their lower ends on the same axis on opposite sides of said tray, hook-like supports swiveled on the upper ends of said links, a U-shaped latch frame having spaced arms pivoted to the upper ends of said links, and means providing spaced notches along the sides of said tray for coacting with said pivoted latch frame for levelly supporting the tray when said supports are hooked over the seat back.

7. In the tray assembly defined in claim 6, said tray being reversible through 180° about its pivot connection with said links and having additional spaced notches coacting with said latch frame for leveling it in reversed position.

8. In the tray assembly defined in claim 6, said supports being freely swiveled about parallel axes extending lengthwise of said links.

References Cited in the file of this patent

UNITED STATES PATENTS

| | | |
|---|---|---|
| 1,630,889 | Clarke | May 31, 1927 |
| 1,817,056 | Belgard | Aug. 4, 1931 |
| 1,921,462 | Graham | Aug. 8, 1933 |
| 2,211,962 | Morris | Aug. 20, 1940 |
| 2,240,395 | Evans | Apr. 29, 1941 |
| 2,672,988 | Johnson | Mar. 23, 1954 |
| 2,682,438 | Davis | June 29, 1954 |
| 2,693,400 | Erickson | Nov. 2, 1954 |